United States Patent [19]

Stanfield

[11] Patent Number: 4,843,768

[45] Date of Patent: Jul. 4, 1989

[54] ABRADING APPARATUS AND PROCESS FOR MAKING THE SAME

[75] Inventor: Charles K. Stanfield, Crete, Ill.

[73] Assignee: B & J Manufacturing Company, Glenwood, Ill.

[21] Appl. No.: 914,771

[22] Filed: Dec. 1, 1986

[51] Int. Cl.[4] .............................................. B24D 5/10
[52] U.S. Cl. .................. 51/206 R; 51/206 P; 51/266; 29/78; 15/236.08
[58] Field of Search ............ 51/206 R, 266, 356, 51/206 P, 206.4, 394, 358, 293, 295, 331, 352, 376, 382, 372, 209 R, 209 DL; 15/93, 236 C; 29/815, 78, 79

[56] References Cited

U.S. PATENT DOCUMENTS

| 1,461,376 | 7/1923 | Bartlett . | |
| 1,878,414 | 9/1932 | Legge . | |
| 2,605,592 | 8/1952 | Cosmos . | |
| 2,673,389 | 3/1954 | Hawkinson | 29/79 |
| 2,979,123 | 4/1961 | Frohlich et al. . | |
| 2,996,109 | 8/1961 | MacMillan . | |
| 2,996,110 | 8/1961 | Bosomworth et al. . | |
| 3,162,187 | 12/1964 | Christensen . | |
| 3,259,959 | 7/1966 | Tobey . | |
| 3,353,526 | 11/1967 | Daem et al. . | |
| 3,420,010 | 1/1969 | Tobey | 51/356 |
| 3,587,554 | 6/1971 | Nelson et al. . | |
| 3,618,187 | 11/1971 | Jensen . | |
| 3,852,923 | 12/1974 | Hess | 51/352 |
| 3,928,900 | 12/1975 | Salukvadze et al. | 29/78 |
| 4,199,903 | 4/1980 | Fitzpatrick . | |
| 4,287,648 | 9/1981 | Hineborg et al. | 29/79 |
| 4,295,274 | 10/1981 | Bricher | 15/236 R |
| 4,325,276 | 4/1982 | Jordan | 29/78 |

FOREIGN PATENT DOCUMENTS

| 0547403 | 10/1957 | Canada | 51/358 |
| 0452112 | 11/1927 | Fed. Rep. of Germany | 29/78 |

OTHER PUBLICATIONS

Golden Air, B&J Mfg. Co. (Brochure) GA—1.
Whitewall Grinding Wheel, B&J Mfg. Co. (Brochure) RC—75—1.
Star, B&J Mfg. Co. (Brochure) RC—74—1 (RC—1001).
Carbide, B&J Mfg. Co. (Brochure) RC—74—1.

Primary Examiner—Frederick R. Schmidt
Assistant Examiner—Robert A. Rose
Attorney, Agent, or Firm—Niro, Scavone, Haller & Niro

[57] ABSTRACT

An abrading apparatus formed from sheet stock and processes for making the same are disclosed. The abrading apparatus has a base with a plurality of cantilevered members extending from the periphery of the base with each cantilevered member formed to provide a discontinuous abrading surface along the periphery of the apparatus. A process for making this abrading apparatus includes the steps of forming from a single piece of sheet stock a base having a plurality of cantilevered members, positioning the cantilevered members at an angle relative to the plane of the base, and forming the cantilevered members to provide exterior surfaces upon which an abrasive surface may be provided.

3 Claims, 3 Drawing Sheets

FIG. 2
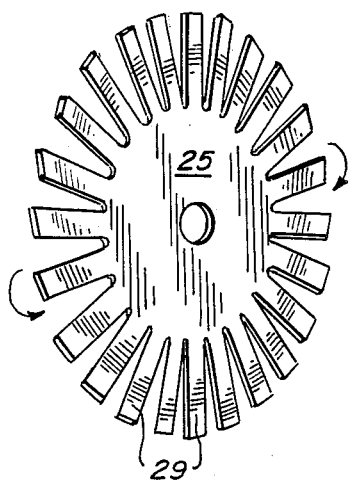
FIG. 3
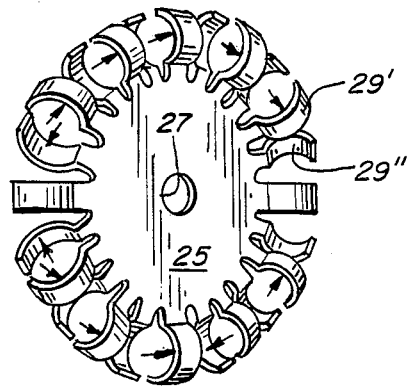
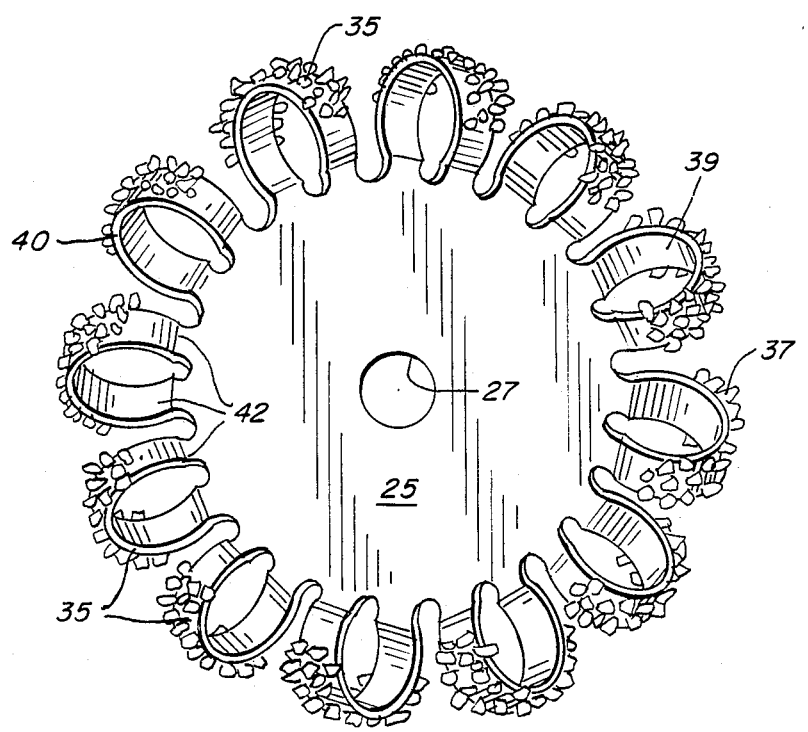
FIG. 1

ABRADING APPARATUS AND PROCESS FOR MAKING THE SAME

BACKGROUND OF THE INVENTION

The present invention relates to an abrading apparatus and to a process for its manufacture. More specifically, this invention relates to a tire abrading tool made from sheet stock and designed to provide a discontinuous abrading surface along the exterior portions of the tool, and to a process form making such a tool.

In the tire industry, tire abrading tools or rasps are used to prepare the surface of a tire for repair operations. Such tools are used to remove worn tread or sidewalls and to otherwise condition areas of a tire surface in preparation for recapping, retreading or other operations in which new rubber is applied to the tire surface. Tools of this general type are disclosed in U.S. Pat. Nos. 1,461,376; 2,979,123; 2,996,109; 3,259,959; and 3,420,010.

These tools are generally designed with surfaces which act on the tire surfaces to remove excess old rubber and also act to roughen or otherwise condition the abraded surface of the tire to effectively bind the new rubber applied in the vulcanizing repair or recapping operation.

The treatment or preparation of tire carcasses in this manner presents several problems which must be considered in the design and manufacture of tire abrading tools. Substantial heat is generated in the abrading process, which tends to melt or burn the rubber surface causing reversion of the rubber material and impeding the abrading action. Such heat also tends to materially reduce the useful life of the abrading surface of tools used for this purpose. Moreover, considerable amounts of rubber particles, dust and smoke are produced which also tend to interfere with the abrading process and from which the tool operator must be protected.

Heretofore, however, abrading tools or rasps designed to avoid some of these problems, have been relatively expensive to manufacture.

SUMMARY OF THE INVENTION

The present invention is directed to a novel abrading tool which is made from sheet stock and provided with a discontinuous abrading surface along its periphery. The abrading tool of the present invention is designed to dissipate the heat generated by the abrading process and to facilitate the cooling of the abrading surface and the abrading tool itself. The novel design of the abrading tool of the present invention provides a tool which achieves an extended useful life when compared to known abrading tools, while requiring substantially lower amounts of abrasive material along its periphery. The present invention is also directed to the process of making an abrading tool of relatively simple design from sheet stock and particularly sheet metal.

In accordance with the present invention, an abrading apparatus formed from sheet stock is provided having a base and a plurality of cantilevered members extending from the periphery of the base, each of the cantilevered members being formed to provide a discontinuous abrading surface along the periphery of the abrading apparatus. The cantilevered members may be formed into various shapes, such as, semicircles, loops, half-ovals, ovals, arcs, angled configurations or the like. The external surface areas of the cantilevered members are coated or embedded with an abrasive material, or treated in some manner, to provide a discontinuous abrasive surface of the periphery of the apparatus.

A preferred embodiment of the present invention contemplates a unitarily constructed abrading apparatus formed from a single piece of sheet stock having a base and a plurality of members radially extending from the periphery of the base, each radial member having an outer abrading surface. The radial members are generally semicircular or loop-shaped and each member generally lies in a plane which is angularly displaced from the plane of the base of the apparatus. An abrasive material is deposited on a portion of the external surface areas of the radial members to provide a discontinuous abrading surface.

One preferred process for making such an abrading apparatus according to the present invention comprises forming from a single piece of sheet stock a base having a plurality of cantilevered members extending along its periphery. The cantilevered members are then angularly displaced from the plane of the base and formed to provide surfaces on which the abrading material may be deposited. Depending on the type of sheet material used, additional treatment with heat may also be required to increase the hardness of the abrading apparatus.

It is, therefore, an object of the present invention to design an abrading apparatus having a discontinuance abrading surface along its periphery.

Another object of this invention is to provide an abrading apparatus which is designed to dissipate the heat generated by the abrading process and to facilitate the cooling of the abrading surface and the abrading tool itself.

A further object of this invention is to design an abrading apparatus having a discontinuous abrading surface which is extremely simple and economical in construction.

It is a further object of this invention to design an abrading apparatus which is unitarily constructed from a single piece of sheet stock.

Another object of this invention is to provide a process by which an abrading apparatus is made from a single piece of sheet stock.

Further objects of this invention are to design an abrading apparatus with an extended useful life span as compared to known abrading tools and to provide an apparatus which requires substantially lower amounts of abrading materials due to its novel design.

These and other objects of the present invention together with the advantages thereof will become apparent to those skilled in the art from the detailed disclosure of the present invention as set forth below.

BRIEF DESCRIPTION OF THE DRAWINGS

FIG. 1 is a elevational view of an embodiment of the abrading apparatus of the present invention;

FIG. 2 is a perspective view of a preform disc used in the formation of the abrading tool of FIG. 1 having a central aperture and radially extending members which are angularly displaced from the plane of the disc;

FIG. 3 is a perspective view of the disc of FIG. 2 in which the radially extending members are formed into generally semicircular segments which are alternately disposed on opposite sides of the plane of the disc;

DETAILED DESCRIPTION OF THE INVENTION

Figure 4:
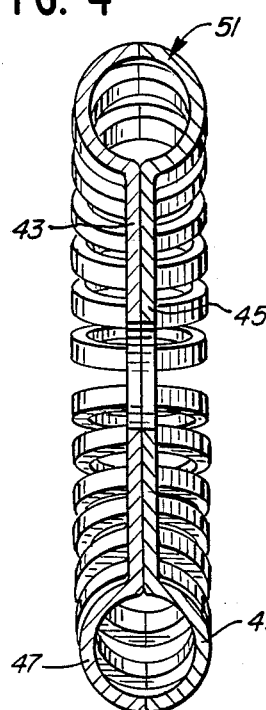
FIG. 4 is a center sectional view of an embodiment of the tire abrading tool of the present invention in which two disc bases with generally semicircular segments are juxtaposed such that the semicircular segments of one disc base abut the semicircular segments of the other base.

Considering the invention in detail, an abrading apparatus in accordance with the present invention generally comprises a base formed from sheet stock having a plurality of cantilevered members extending from the periphery of the base. The cantilevered members are preferably of a general configuration such that their outer extremities are separately disposed along the periphery of the base. The cantilevered members may be angularly displaced from the plane of the base to provide an abrading surface along its periphery.

As any tire apparatus or rasp is rotated on a motor driven shaft, or the like, to remove the unwanted rubber from the surface of a tire carcass, substantial heat may be generated by the frictional forces causing reversion of the rubber surface and decreasing the effectiveness of the abrading tool. Substantial amounts of rubber particles and dust are also produced by the abrading action. With the instant abrading apparatus, such problems are significantly reduced.

When the instant abrading apparatus is used, it is believed that the rotation of the apparatus causes a more effective flow through or around the outer members and to be forced outwardly away from the abrading surface. This enhanced flow of air through or around the outer members facilitates the dissipation of heat generated by the abrading process and cools the abrading surface to avoid the reversion of the rubber surface. In effect, this flow of air helps to maintain the temperatures of the abrading surface and the abrading apparatus itself at a level close to room temperature. As a result, the reversion of the rubber surface is avoided, and the useful life span of the abrading apparatus is extended.

Furthermore, the velocity and direction of the air flow through or around the members of the abrading apparatus appear to improve the removal of rubber particles and dust away from the abrading surface. Thus, the design of the abrading apparatus itself also helps to prevent the clogging of the members by the abraded material.

It is particularly important to note that the abrading apparatus structure by which these advantages are achieved is extremely simple and capable of being readily and economically manufactured. The design and construction of the abrading apparatus from sheet stock further simplifies the actual manufacture of the tool and reduces its cost, as well.

Referring generally to FIGS. 1 through 3, one preferred embodiment of the abrading apparatus of the present invention will be seen to include a base 25 of sheet material preferably sheet steel or other sheet metal, but also including other materials. The base may be of various configurations, with the preferred embodiment including a circular disc base 25, with a central aperture 27 as in FIG. 1, for receipt of or connection to a drive shaft for rotational motion of the apparatus.

The base is provided with a plurality of cantilevered members 29, as shown in FIG. 2, integrally disposed and extending outwardly from the periphery of the base. The cantilevered members 29 are angularly displaced from the plane of the base and may be twisted, turned or formed into various shapes to obtain the desired configurations. For example, in FIG. 3, the cantilevered members 29 are shown formed into generally semicircular shapes with adjacent members 29' and 29" disposed on opposite sides of the planar extension of the base. The members may remain in this position or may be formed further (as depicted by the arrows in FIG. 3) such that the cantilevered members on one side of the base abut those disposed on the opposite side to form generally loop-shaped members 35, as in FIG. 1. The exterior surfaces of the generally loop-shaped members 35 may contain an abrasive material, 37, or be treated in some manner, to provide the tool with a discontinuous abrading surface. The cantilevered members 29, of FIG. 2, may also be turned, twisted or formed into a wide variety of other shapes or configurations which will be apparent to those skilled in the art. FIGS. 5, 6, 7, 8 and 11–14 illustrate exemplary alternate configurations. Such configurations may also be arranged with all members disposed on one side of the central body, as shown generally in FIG. 7; one or more members disposed on opposite sides of the base, as shown generally in FIG. 11 and 12; members abutting members disposed on the opposite side of the base, as shown in FIG. 1; or members adjacent to and spaced from members disposed on the opposite side of the base, as shown generally in FIG. 5. All such cantilevered member arrangements are contemplated within the present invention.

The exterior surface area of the formed cantilevered members preferably contains a deposit of an abrasive material to provide the apparatus with a discontinuous abrading surface. The exterior surfaces may also be treated through other conventional techniques to provide such an abrading surface. Preferably, the exterior surface of the cantilevered members are substantially coated with an abrasive material as shown in FIG. 1, with the interior surfaces 39 substantially free of any abrasive material. However, in another form of the invention the abrasive material can be disposed in the cantilevered members with a portion exposed at the surface at all times as the members undergo wear. The side surfaces 40 of the members may also support a deposit of abrasive material.

Referring to FIG. 1 in summary, a preferred embodiment of a unitarily constructed tire abrading apparatus in accordance with the present invention as outlined above will be seen to include a circular disc base 25 of metallic material such as sheet steel or other sheet metal. The disc is provided with a central aperture 27 for receiving a drive shaft for rotational motion. The disc base 25 is provided with a plurality of loop-shaped members 35 integrally disposed on and extending radially from the periphery of the disc. The loop-shaped members 35 and formed from the cantilevered members 29, with the base portions 42 of each member separately disposed on and circumferentially spaced along the periphery of the disc. The loop-shaped members 35 are angularly displaced from the plane of the disc 25 and an abrasive material 37 is deposited on their external surfaces to provide a discontinuous or interrupted abrading surface along the periphery of the abrading appartus.

Figure 8:
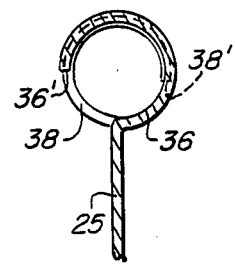
FIG. 8 is a partial sectional view of a portion of an alternate embodiment of the abrading tool of the present invention showing generally circular segments of a single disc base (with grit removed for clarity) which overlap and extend beyond adjacent circular segments.
Figure 9:
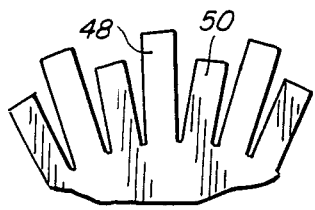
FIG. 9 is an elevational view of a portion of the preform disc similar to that of FIG. 2 but with radially extending members of different lengths.
Figure 10:
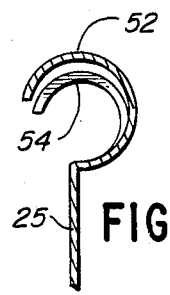
FIG. 10 is a partial sectional view of a portion of an alternate embodiment abrading tool made from the preform disc of FIG. 9 in which the radially extending members are formed into generally semicircular segments of differing heights.

FIG. 8-11 show modifications of the preferred embodiment of FIG. 1. In FIG. 8, the alternating cantilevered members 29 are formed into substantially circular segments 36 and 38 having their respective free ends 36'and 38'disposed on opposite sides of the base 25. Segments 36 and 38 are spaced from one another to provide the desired discontinuous abrading surface at the periphery of the tool. In FIG. 9, the alternating radially extending members 48, 50 are of non-uniform height. These non-uniform radially extending members are then formed into generally semicircular segments 52, 54 as shown in FIG. 10 with the height of one semicircular member 52 greater than that of the adjacent semicircular member 54. As further shown in FIG. 11, the radially extending members may be formed into generally flat segments 70, 72, alternately disposed on opposite sides of the disc base, as well as into other configurations not shown which will be apparent to those skilled in the art. The exterior surfaces of the segments may then be coated with an abrading material, or treated in some conventional manner, to provide a discontinuous abrading surface along the periphery of the apparatus.

Referring to FIGS. 4, 15, 17 and 18, other embodiments of the abrading apparatus of the present invention are shown. In FIG. 4, the abrading apparatus of the present invention employs a plurality of disc bases 43 and 45. The cantilevered or radially extending members of each disc base 43, 45 are formed into generally semicircular members 47, 49 which are positioned on one side of the planar extension of their respective disc base. The bases 43, 45 are then juxtaposed relative to one another to form a disc body assembly with the free ends of semicircular members 47 on disc base 43 abutting the free ends of semicircular members 49 on the other disc base 45. Thus, generally loop-shaped members 51 are provided in spaced arrangement along the periphery of the disc body. Once again, these members 51 are coated with an abrading material and/or have an abrasive material discontinuously disposed in the members 51, or otherwise are treated to present a discontinuous abrading surface.

Figure 5:
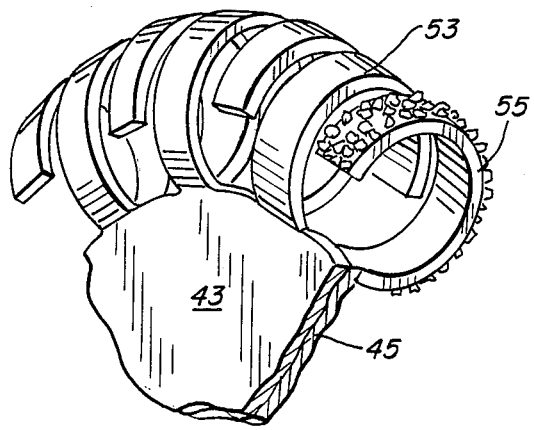
FIG. 5 is a perspective view of a portion of another embodiment of the abrading tool of the present invention in which two disc bases are juxtaposed with alternating generally circular segments, such that the generally circular segments of one disc base are adjacent to and spaced from the generally circular segments of the other base.
Figure 6:
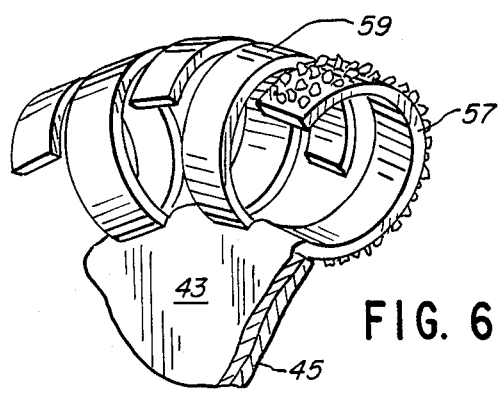
FIG. 6 is a perspective view of a portion of another embodiment of the abrading tool of the present invention in which two disc bases are juxtaposed with alternating generally circular segments, such that the generally circular segments of each disc base extend over and beyond the plane of the base portion of the other disc base.
Figure 7:
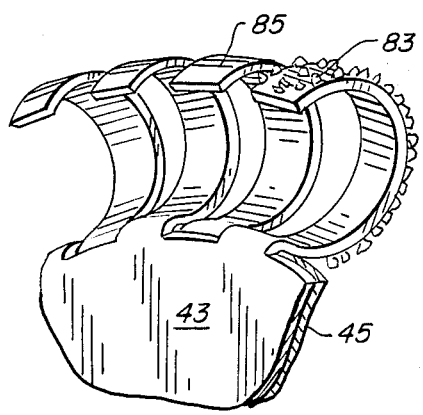
FIG. 7 is a perspective view of a portion of still another embodiment of the abrading tool of the present invention in which two disc bases are juxtaposed and the generally circular segments of one disc base extend over and beyond the plane of the base portion of the other disc base with the generally circular segments of one disc base adjacent to and spaced from the generally circular segments of the other disc base.

A further modification of the abrading apparatus of FIG. 4, may include structures in which the semicircular members of one disc base are substantially aligned with, but do not contact, the semicircular members of the other disc base. For example, the cantilevered members of each disc base 43, 45 may be formed into generally circular segments 53, 55 as shown in FIG. 5, and positioned adjacent to and spaced from the adjacent members of the other disc base. The cantilevered members of each disc base may be also formed into generally circular segments 57, 59 as shown in FIG. 6, with the segments 57 of base 43 extending over and beyond base 45, and the segments 59 of base 45 extending over and beyond base 43. The members may further be formed as shown in FIG. 7, with the alternating segments, 83, 85, of each disc base 43, 45 aligned in the same direction.

Figure 12:
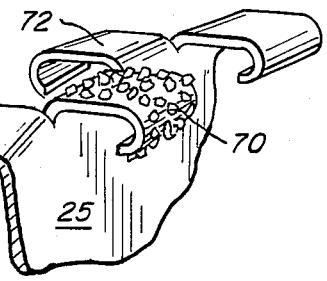
FIG. 12 is a perspective view of a portion of an alternate embodiment of the abrading tool of the present invention in which two disc bases are juxtaposed with the radially extending members of each disc formed into angular configurations.
Figure 13:
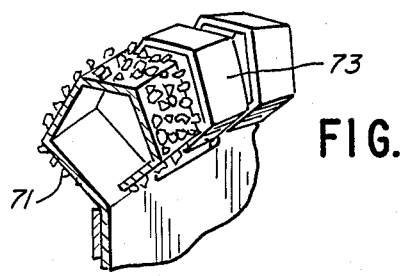
FIG. 13 and 14 are perspective views of portions of alternate embodiments of the abrading tool showing the radially extending members formed into different angular configurations and the members of one disc base adjacent to and spaced from the members of the other disc base.
Figure 14:
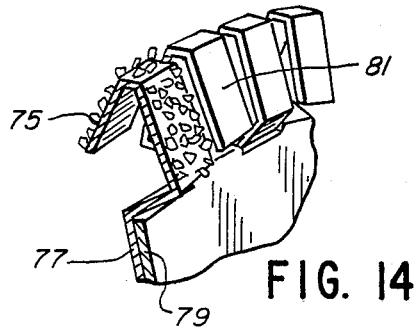

The cantilevered members used with a disc base assembly may also be formed into other types of configuration, including, but not limited to those shown in FIGS. 12, 13 and 14. In FIG. 12, the cantilevered members are formed into substantially flat segments 65, 67 which are alternately disposed on opposite sides of the disc base assembly 69. In FIG. 13, angular segments 71, 73 are formed, which are adjacent to and spaced from the angular segments extending from the juxtaposed base. And in FIG. 14, the angular segments 75 of disc base 77, extend over and beyond disc base 79 and the angular segments 81 of disc base 79 extend over and beyond disc base 77. The angular segments 77, 81 are also adjacent to and spaced from each other.

Figure 15:
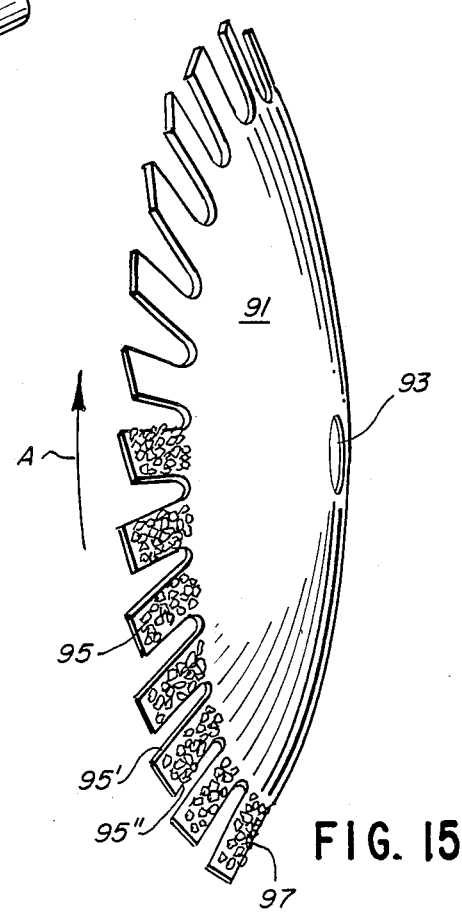
FIG. 15 is a perspective view of a dish-shaped embodiment of the abrading tool of the present invention in which the radially extending members are twisted and provided with an abrasive material on their exterior surfaces.

FIG. 15 shows another embodiment of the abrading apparatus of the present invention. In FIG. 15, a dish-shaped base 91 with a central aperture 93 and a plurality of cantilevered member 95 is formed from a single piece of sheet stock. The cantilevered members 95 are angularly displaced or canted such that the leading edge 95′ (that is the forward edge of member 95 in terms of the direction of rotation of the tool as depicted by arrow A) is positioned below the trailing edge 95″. This orientation of the members 95 provides the capability of controlling the abrasive action of the tool by varying the pressure applied to the abraded surface via the tool itself.

Figure 16:
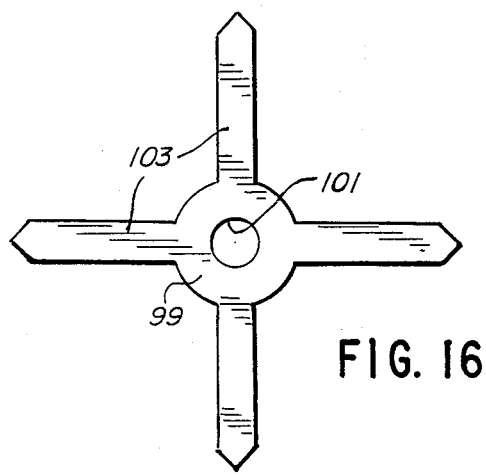
FIG. 16 is an elevational view of another preform used in the construction of an alternative embodiment of the present invention having a central aperture and radially extending members.
Figure 17:
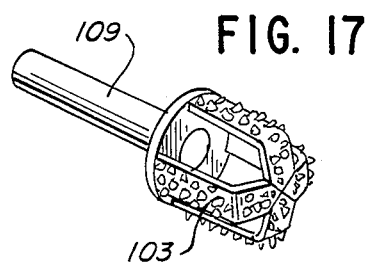
FIG. 17 is a perspective view of a generally bullet-shaped embodiment of the present invention constructed from the preform of FIG. 16.

FIGS. 16 and 17 depict a still further embodiment of the present invention is illustrated. In accordance with this embodiment, a base 99 with a central aperture 101 and a plurality of cantilevered members 103 is formed from a single piece of sheet stock. The cantilevered members 103 are integrally joined to the base 99 and have free ends which are preferably tapered at their free ends. The cantilevered members 103 are then formed with the cantilevered members 103 abutting at their free ends to provide a generally bullet shaped configuration. The exterior surfaces of the formed members are then coated with an abrasive material 107 or treated in some manner, to provide the desired discontinuous abrading surface. A drive shaft 109, may be provided, if necessary, for rotation of the apparatus.

Figure 18:
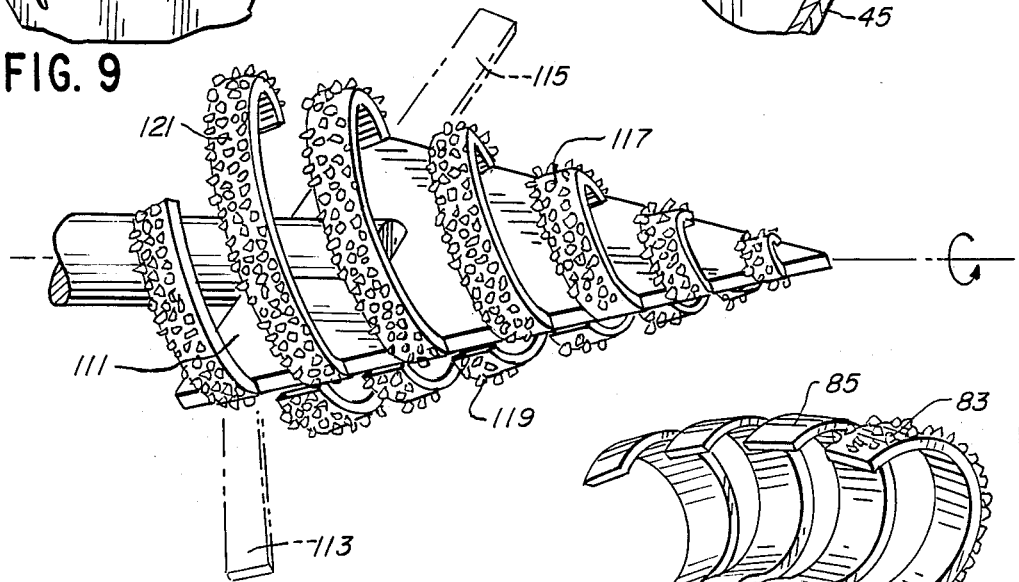
FIG. 18 is a perspective view of a generally cone-shaped embodiment of the abrading tool of the present invention.

Another embodiment of the abrading apparatus of the present invention is shown in FIG. 18, in which a triangular or cone-shaped base 111 with cantilevered members 113, 115 (shown in phantom) is formed from a single piece of sheet stock. The cantilevered members 113, 115 extend from the periphery of the base 111 and are displaced from the plane of the base 111 to form generally arcuate shaped members 117, 119. The arcuate shaped members 117, 119 may extend across the front and back sides of the base, as shown in FIG. 18, or they may interleave and extend across just one face of the base, or alternately interleave across the back and front sides of the base. The cantilevered members may also be formed into different configurations which will be readily apparent to those skilled in the art. The exterior surfaces of the formed members are again coated with an abrasive material to provide a cone-shaped abrading apparatus with a discontinuous abrading surface.

With the abrading apparatus constructions just described, rotation of the apparatus improves air flow through or around the formed members, causing rubber particles and dust to be swept outward and away from the abrading surface more effectively. Such air flow maintains a lower operating temperature of the abrading surface and tool while the flow of particles and dust is directionally controlled. Furthermore, the velocity of the air and particle flow and the design of the abrading apparatus are such that the clogging of the semicircular or loop-shaped members by the abraded material is reduced or prevented. These improved operating characteristics result in an abrading apparatus with extended useful life as compared to conventional prior art abrading tools. It has been determined, for example, that the abrading tool of the present invention, when used in tire repair and retreading applications, has a useful life as much as 100% longer than that of prior art tools. This is even more remarkable in view of the fact that substantially less abrasive material, i.e. 50% of carbide grit abrasive, is used with the present invention as compared to conventional, prior art tools.

Examples of the processes useful in making a tire abrading apparatus of the present invention will be explained with reference to the various embodiments of the apparatus illustrated in the drawings.

Figure 11:
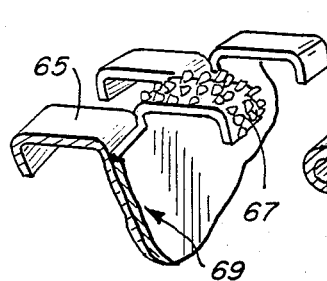
FIG. 11 is a perspective view of a portion of still another embodiment of the abrading tool of the present invention in which the radially extending members of the single disc base are formed into angular configurations and are alternately disposed on opposite sides of the disc base.

A base with a plurality of cantilevered members, as shown for example in FIGS. 2, 9 and 16, is formed by stamping, cutting or shearing a single piece of sheet stock into the configuration or shape desired. While FIGS. 2, 9 and 16 illustrate that material is removed by stamping or cutting, the process of the present invention also contemplates shearing the material — in effect cutting without removing material, such as shown in FIG. 11. The cantilevered members 29, as shown generally in FIG. 2, then may be turned or twisted in such fashion as to offset or angularly displace the members from the plane of the base 25. By further forming, the cantilevered members can be formed into segments which are either semicircular, as shown in FIG. 3, generally circular as shown in FIGS. 5 and 6, arcuate, as shown in FIG. 18, or angular in shape, as shown in FIGS. 11 through 14, to provide exterior surfaces on said members which may be coated with an abrading material or treated in some manner to form a discontinuous abrading surface.

The specific steps utilized in this process vary slightly depending upon the particular abrading tool desired. If the preferred embodiment of FIG. 1 is desired, a circular disc 25 with a plurality of radially extending members 29, as shown generally in FIG. 2, is formed by stamping, cutting or shearing a single piece of sheet stock into the configuration as shown. The radially extending members 29, are then turned or twisted as shown in FIG. 2, to angularly displace the members from the plane of the disc base. As illustrated in FIG. 3, the radially extending members are then formed into generally semicircular segments 29′ and 29″ which are alternately disposed on opposite sides of the plane of the disc base 25. The semicircular segments of FIG. 3, are then displaced as shown by the arrows to form the generally loop-shaped members 35 of FIG. 1. The exterior surfaces of the loop-shaped members 35 are then coated with an abrasive material 37.

The circular disc and radially extending members may be formed in one step, with the radial members being of substantially uniform dimensions as shown in FIG. 2. The radially extending members may also be formed with varying dimensions, as illustrated in FIG. 9, wherein the alternating members 48, 50 are of different lengths. A relatively small number of cantilevered members may be formed, as shown in FIG. 16, or a substantial number may be formed, as shown generally in FIG. 2.

The angular displacement, if any, of the radial members from the plane of the disc body is preferably uniform throughout all members as shown in FIG. 2. The angle of displacement may vary, but preferably the angle should be such that opposite ends of each radially extending members lie on opposite sides of the plane of the disc body.

As contemplated in the process of the present invention a variety of sheet stock materials may be used, including but not limited to, sheet metals or plastics. In addition to stamping, cutting or shearing the bases from sheet stock, molding such configurations where appropriate is also contemplated. The abrasive material may be any material commonly used in the industry, including, but not limited to, tungsten carbide grit. The application of the abrasive material to the exterior surfaces of the cantilevered members is accomplished by conventional methods known to those of ordinary skill in the art. If the material utilized in the process so requires, additional heat treatment of the apparatus may also be accomplished by conventional methods known to those of ordinary skill in the art.

It should be understood, of course, that the apparatus and processes described above are intended to illustrate embodiments of the invention and do not limit the scope of the invention, which is defined by the claims set forth below. It should also be understood that alternatives to and equivalents of the specific embodiments described will become apparent to those skilled in the art and can be made and indeed are contemplated without departing from the scope of the invention as defined in the claims set forth below.

WHAT IS CLAIMED IS:

1. An abrading tool comprising:
    a rotatable and generally planar and circular hub having a central aperture and a plurality of integral and radially extending generally loop-shaped members;
    each said loop-shaped member being positioned in a plane disposed at an oblique angle to the plane of said hub;
    each said loop-shaped member having an outer elongated abrading surface disposed at said oblique angle, and an opposed inner surface;
    and said loop-shaped members being spaced to provide air access to said inner surface during rotation of said abrading tool.

2. The abrading apparatus of claim 1 wherein said abrading surface of each said loop-shaped member includes an abrasive material affixed to said surface.

3. The abrading tool of claim 1 wherein said planar hub comprises a plurality of circular discs from which said loop-shaped members extend.

* * * * *